United States Patent [19]
Asou et al.

[11] Patent Number: 5,415,437
[45] Date of Patent: May 16, 1995

[54] TUBE COUPLING FOR FLUIDIC APPARATUS

[75] Inventors: Yoshio Asou; Bunya Hayashi; Hideharu Sato; Takumi Matsumoto, all of Tsukuba, Japan

[73] Assignee: SMC Corporation, Tokyo, Japan

[21] Appl. No.: 162,780

[22] Filed: Dec. 8, 1993

[51] Int. Cl.⁶ .................................... F16L 39/00
[52] U.S. Cl. ......................... 285/137.1; 285/307
[58] Field of Search ............... 285/137.1, 307, 208, 285/212, 205

[56] References Cited

U.S. PATENT DOCUMENTS

| | | | |
|---|---|---|---|
| 3,142,358 | 7/1964 | Woerneide, Jr. | 285/212 |
| 3,869,153 | 3/1975 | De Vincent et al. | 285/137.1 |
| 3,929,356 | 12/1975 | De Vincent et al. | 285/137.1 |
| 4,116,476 | 9/1978 | Porter et al. | 285/137.1 |
| 4,468,054 | 8/1984 | Orth | 285/137.1 |
| 4,611,831 | 9/1986 | Truchet | 285/137.1 |
| 4,753,268 | 6/1988 | Palau | 285/137.1 |
| 4,893,845 | 1/1990 | Bartholomew | 285/137.1 |
| 4,920,766 | 5/1990 | Yamamoto et al. | 285/137.1 |
| 5,169,178 | 12/1992 | Hunzinger | 285/137.1 |
| 5,271,646 | 12/1993 | Allread et al. | 285/137.1 |

FOREIGN PATENT DOCUMENTS

| | | |
|---|---|---|
| 0168333 | 1/1986 | European Pat. Off. . |
| 0521776 | 1/1993 | European Pat. Off. . |
| 576232 | 8/1924 | France .................. 285/137.1 |
| 2431680 | 1/1975 | Germany . |
| 3825313 | 2/1990 | Germany ............... 285/137.1 |
| 140352 | 3/1920 | United Kingdom ....... 285/208 |
| 772158 | 4/1957 | United Kingdom ..... 285/137.1 |

*Primary Examiner*—Eric K. Nicholson
*Attorney, Agent, or Firm*—Oblon, Spivak, McClelland, Maier & Neustadt

[57] ABSTRACT

A tube coupling for fluidic apparatus connects flexible hose or other tubes to ports of different sizes and shapes provided in fluidic apparatus. The tube coupling comprises a base to be attached to a port in a fluidic apparatus, a tube connector to connect a tube, and a metal holder that keeps in position the tube connector attached to the base.

5 Claims, 3 Drawing Sheets

TUBE COUPLING FOR FLUIDIC APPARATUS

FIELD OF THE INVENTION

This invention relates to tube couplings for connecting flexible hoses and other tubular products to change-over valves, manifolds and other apparatus for controlling pressurized fluids including compressed air.

DESCRIPTION OF THE PRIOR ART

Flexible hoses and other tubes to lead pressurized fluids including compressed air are connected to ports on change-over valves, manifolds and other fluid controlling apparatus. Such connection is generally achieved by means of a threaded casing attached to one end of such a tube and screwed into the mating port or a one-touch coupling that accomplishes connection by simply inserting the tube end into the mating port. However, these conventional threaded casings and couplings may not be suited for ports of certain sizes and shapes. This problem can be solved if as wide an assortment of casings and couplings as will fit ports of practically all sizes and shapes are prepared. However, such a wide assortment of casings and coupling are difficult to prepare because they will make their handling more intricate and their design, manufacture and inventory control more costly.

SUMMARY OF THE INVENTION

The object of this invention is to provide a tube coupling that permits easy and sure connection of tubes to ports of fluidic apparatus of different sizes and shapes.

To achieve the above object, a one-touch tube coupling according to this invention comprises a base adapted to be detachably fitted to the ports in a fluidic apparatus, a tube coupling to connect a flexible hose or other tubular product to each port, and a metal holder detachably attached to the base to keep each tube coupling as connected to the base, with the base having connection ports of the number equal to that of ports on the fluidic apparatus, the base being designed so that the connection ports thereon individually communicate with the ports on the fluidic apparatus when the base is attached thereto, the metal holder having as many U-shaped notches as the connection ports to hold the tube couplings in position, each U-shaped notch having an edge adapted to engage with a groove around the tube coupling fitted therein to keep the tube coupling in position, and the tube coupling accomplishing connection by simply fitting one end of the tube into the connection port.

Having two notches cut from opposite sides thereof, the metal holder of a preferred embodiment of this invention. is S-shaped when viewed from above.

The base should preferably have on the top surface thereof at least one projection to come in contact with one side of the tube coupling at a point around the hole in which the coupling is fitted that corresponds to the notch in the metal holder.

DESCRIPTION OF THE PREFERRED EMBODIMENTS

Figure 1:
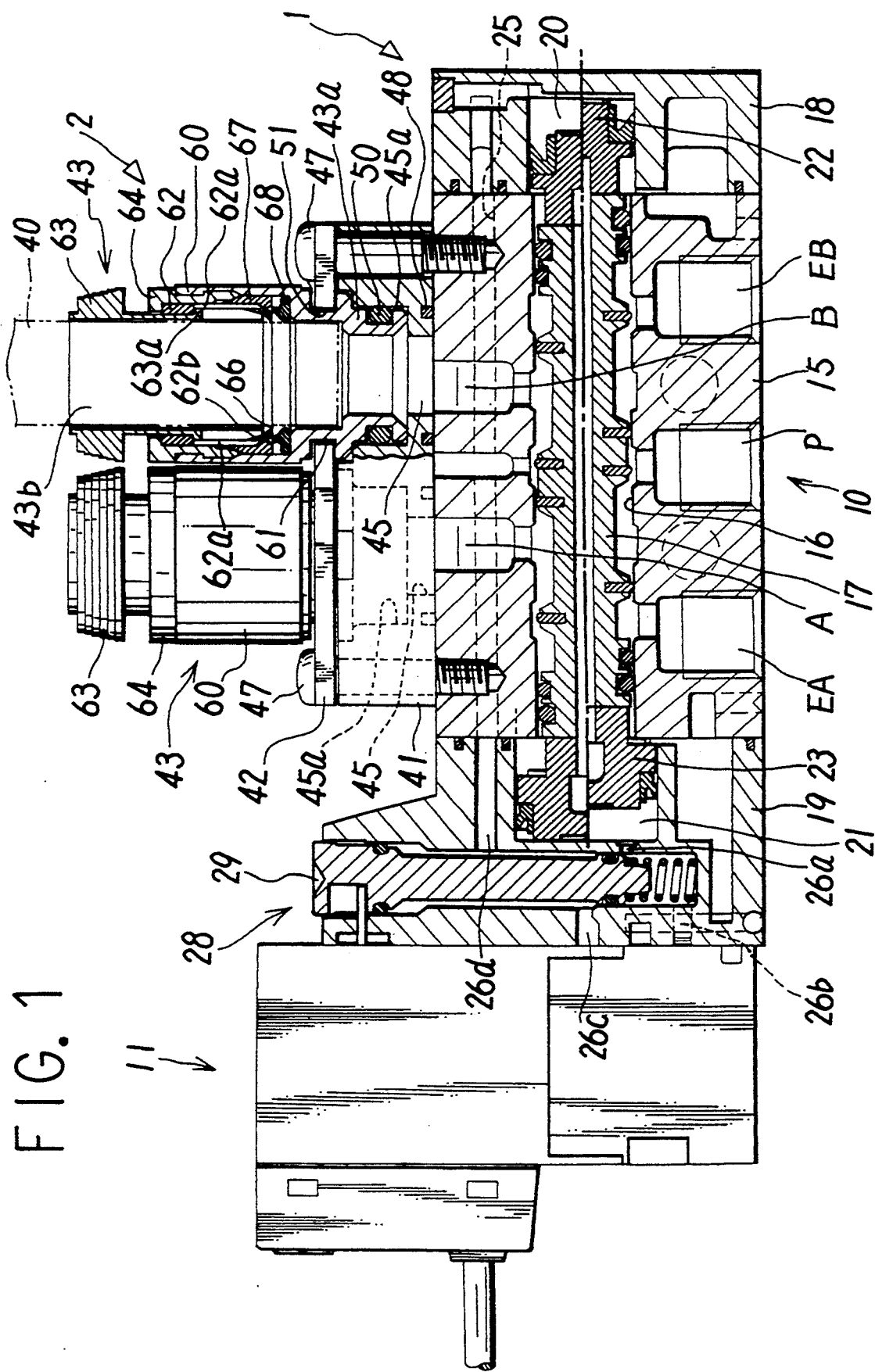
FIG. 1 is a cross-sectional view showing a tube coupling according to this invention attached to a solenoid pilot change-over valve.
Figure 2:
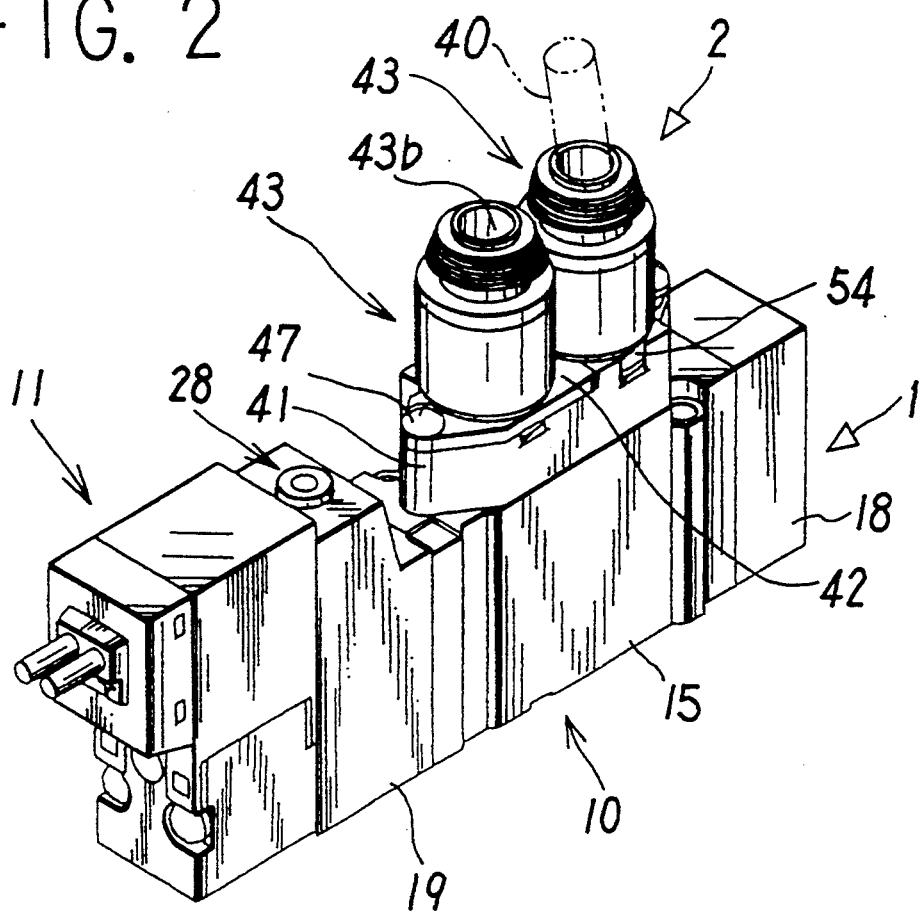
FIG. 2 is a perspective view similar to FIG. 1.
Figure 4:
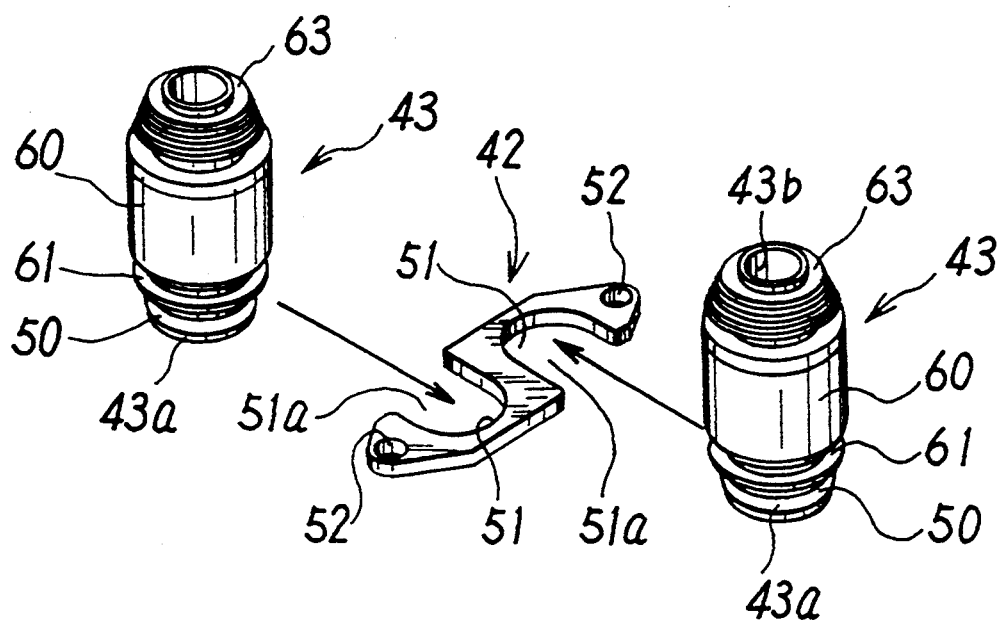
FIG. 4 is an exploded perspective view of a tube coupling and a metal holder thereof.
Figure 3:
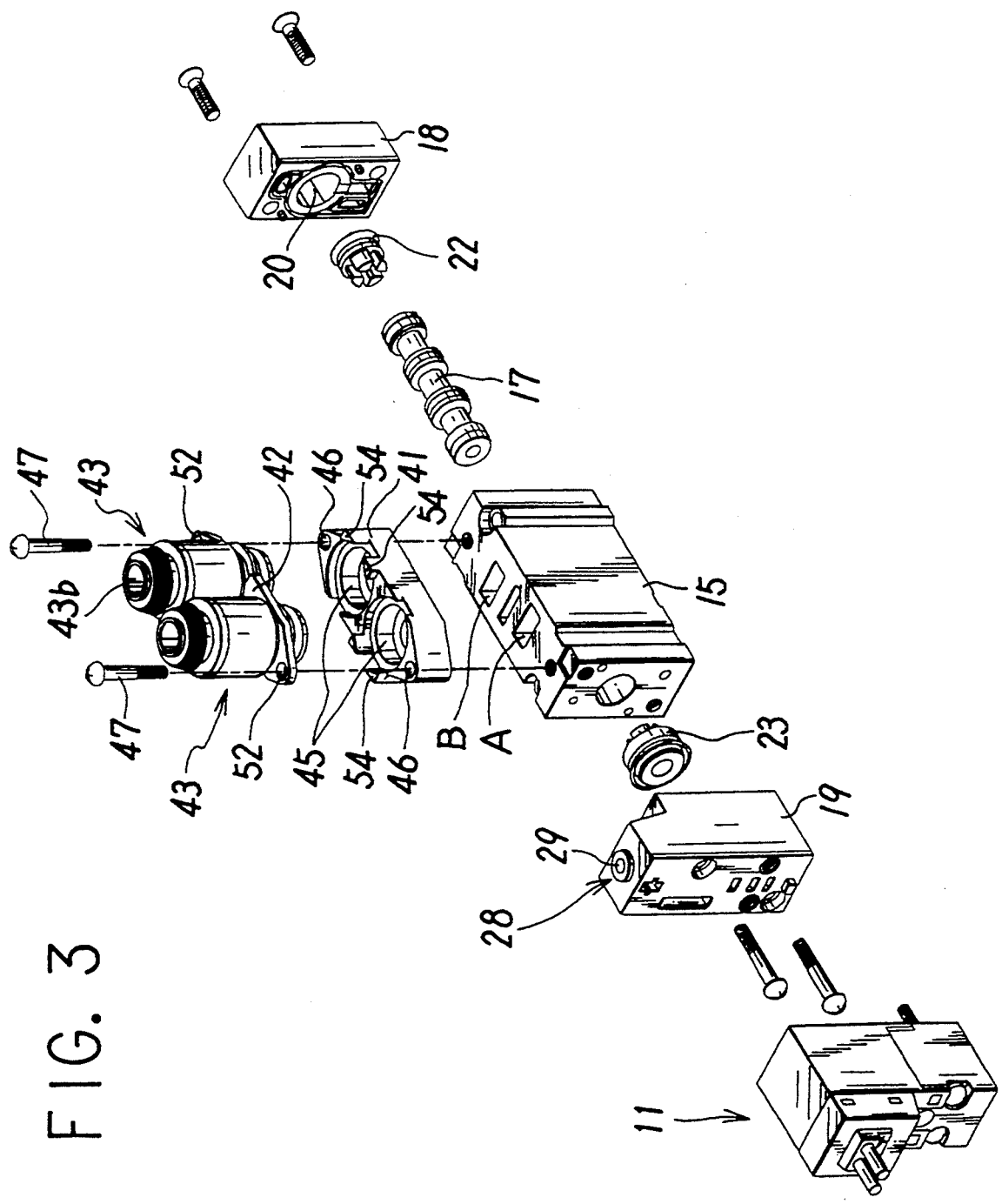
FIG. 3 is an exploded perspective view similar to FIG. 1.

In FIGS. 1 to 4, reference numeral 1 designates a solenoid pilot change-over valve that is an example of a fluidic apparatus, and 2 a tube coupling attached to the change-over valve 1.

The change-over valve 1 comprises a main valve segment 10 that regulates the flow of compressed air or other main fluid and an electromagnetically actuated pilot valve 11 that regulates the flow of a pilot fluid that switches the main valve segment 10.

The main valve segment 10 has a substantially rectangular parallelpiped valve body 15. The valve body 15 has a round intake port P and exhaust ports EA and EB opening in the bottom surface thereof, rectangular output ports A and B opening in the flat top surface thereof, and a valve bore 16 that communicates with the individual ports, with an axially slidable spool-type valve body 17 inserted in the valve bore 16. Rectangular end plates 18 and 19 are attached to both ends of the valve body 15. In the end plates 18 and 19 are formed a smaller-diameter piston chamber 20 and a larger-diameter piston chamber 21, with a smaller-diameter piston 22 and a larger-diameter piston 23 having pressure-receiving faces of different sizes fitted therein so as to be slidable in the axial direction of the main valve body 17.

The smaller-diameter piston chamber 20 always communicates with the intake port P by means of a pilot fluid passage 25, whereas the larger-diameter piston chamber 21 communicates with the intake port P by means of pilot fluid passages 26a, 26b, 26c and 26d through a hand-actuating mechanism 28 and the pilot valve 11. The pilot fluid supplied to or discharged from the larger-diameter piston chamber through the intake port P by the motion of the pilot valve 11 moves the main valve body 17 back and forth. When the main valve body 17 moves to the right as shown in the lower half of FIG. 1, the ports P and A and the ports B and EB communicate with each other. When the main valve body 17 moves to the left as shown in the upper half of FIG. 1, the ports P and B and the ports A and EA communicate with each other.

When an actuating shaft 29 in the hand-actuating mechanism 28 is pressed down, the pilot fluid passages 26a and 26b communicate directly with each other to connect the larger-diameter piston chamber 21 to the intake port P.

A detachable tube coupling 2 mounted on the top surface of the change-over valve 1 connects a tube 40, such as flexible hoses of synthetic resin or rubber, to the output ports A and B provided in the same surface. The tube coupling 2 comprises a base 41 fastened to the change-over valve 1, a metal holder 42 to attach a tube connector 43 to the base 41, and the tube connector 43 for connecting the tube 40.

The base 41 is vertically bored with connection ports 45 whose number is the same as that of the output ports A and B and multiple bolt holes 46 to pass bolts 47 therethrough. An annular sealer 48 to surround each connection port 45 is attached to the flat bottom surface of the base 41. When the base 41 is fastened to the top surface of the change-over valve 1 with bolts 47, the two connection ports 45 individually communicates with the output ports A and B. The upper half of each connection port 45 forms a connector hole 45a with a larger diameter in which a joint 43a carrying a seal ring 50 therearound at the lower end of the tube connector 43 is fitted.

The metal holder 42 is S-shaped when viewed from above, with two U-shaped notches 51 cut from opposite sides of a thin metal sheet having a contour analogous to that of the base 41. When the tube connector 43 is laterally slid from an opening 51a into the notch 51, the edge of the notch 51 interlocks with a groove 61 cut around the tube connector 43. When the metal holder 42 is fastened to the top surface of the base 41, therefore, the metal holder 42 holds each tube connector 43 on the base 41, with the joint 43a at the lower end thereof fitted in the connector hole 45a. The metal holder 42 is fastened to the base 41 by screwing the bolts 47 into the bolt holes 52 provided at both ends of the base 41.

The tube connector 43 can be easily removed from the base 41 and metal holder 42 by laterally sliding out of the notch 51 after unfastening the bolts 47 and detaching the metal holder 42 from the base 41.

Two projections 54 formed around the connection ports 45 in the top surface of the base 41 have an arched inner surface and are provided at intervals so as to mate with the opening 51a of the notches 51 in the metal holder 42. The projections 54 are adapted to come in contact with the side of the tube connectors 43 fastened to the base 41. The projections securely fasten the tube connectors 43 to the base 41 where the metal holder 42 does not engage with the tube connectors 43 at the openings 51a. The number of the projections 54 is not limited to two, but may be either one or three or even more.

Being of the one-touch type, the tube connector 43 connects the tube 40 by simply inserting the end thereof into a connection port 43b provided therein. The tube connector 43 has the joint 43a, an outer cylinder 60 of synthetic resin having the engaging groove 61 mentioned before, an elastic metal chuck 62 adapted to engage with the outer surface of the tube 40 to keep the tube in position, and a release member 63 of synthetic resin that disengages the chuck 62 from the tube 40 to permit the removal thereof.

A cylindrical guide 64 of synthetic resin keeps the cylindrical chuck 62 in position. The lower end of the chuck 62 is slit into expandable side walls 62a, whereas the heavier-walled upper end thereof remains unslit. The tips of the lower bent ends 62b of the side walls 62a form an edge 66 that bites into the tube 40. An elastic collet 67 presses the side walls 62a of the chuck 62 inward. A sealer 68 coming in contact with the periphery of the tube 40 is provided below the collet 67.

The cylindrical release member 63 has a pressing segment 63a that comes in contact with the bent ends 62b of the chuck 62. When the release member 63 is pressed in, the pressing segment 63a comes in contact with the bent ends 62b. The bent ends 62b thus expanded outward disengage the edge 66 from the tube 40.

When the end of the tube 40 is inserted in the connection port 43b in the tube connector 43, the edge 66 at the lower end of the chuck 62 bites into the periphery of the tube 40 to accomplish the connection thereof.

The tube 40 is disconnected from the tube connector 43 by pressing in the release member 63, whereupon the pressing segment 63a at the lower end of the release member 63 expands outward the bent ends 62b of the side walls 62a to disengage the edge 66 from the tube 40. The tube 40 thus freed can be drawn out.

The tube coupling 2 according to this invention assures easy and secure connection of the tube 40 to ports of any shape and size, whether rectangular as shown in the figures or circular or of such size as does not match the joint 43a of the tube connector 43. By modifying the base 41 so as to permit use with change-over valves 1 of different types, the tube 40 can be securely connected to ports of different sizes and shapes by the use of the tube coupling 2 of this invention. In this case, the shape and effective opening area of the connection port 45 should preferably be such as are suited for use with the change-over valve whose ports have the largest diameter and area of the group considered.

When need arises, as in changing to a tube connector with a connection port 43b of different diameter or removing a broken tube connector, the tube connector 43 can be easily and quickly removed from the base 41 for replacement with a new one by unfastening the bolts 47, detaching the metal holder 42 from the base 41, and laterally sliding the tube connector 43 out of the notches 51.

This invention is by no means limited to the embodiment described above, but, of course, may permit various modifications without departing from its spirit and scope.

What is claimed is:

1. A tube coupling for a fluidic apparatus which comprises:
   a detachable base adapted to be attached to at least one port in the fluidic apparatus, at least one tube connector to connect a flexible hose or other tubes, and a detachable metal holder adapted to be attached to the base to keep each said at least one tube connector fastened to the base;
   the base having a connection port for each respective port of the at least one port in the fluidic apparatus to hold each at least one tube connector and establish individual communication with each port in the fluidic apparatus when the base is attached thereto, with a respective tube connector provided for each said at least one port;
   the metal holder having a U-shaped notch for each tube connector to keep in position each tube connector fitted therein, each notch having an edge that comes in engagement with a groove around the tube connector fitted therein, thereby securedly keeping the tube connector in position; and
   the tube connector being of a one-touch design that accomplishes the connection of the tube by simply inserting the end of the tube into the tube connector.

2. A tube coupling for a fluidic apparatus according to claim 1, in which the metal holder is S-shaped when viewed from above, with two notches cut from both sides thereof.

3. A tube coupling for a fluidic apparatus according to claim 1, in which at least one projection adapted to come in contact with the side of each at least one tube connector is provided around each connection port in a top surface of the base at a point corresponding to each notch in the metal holder.

4. The tube coupling as set forth in claim 1, wherein said base is disposed between said metal holder and said fluidic apparatus.

5. The tube coupling of claim 1, wherein said metal holder includes at least one bolt aperture disposed at a location other than said U-shaped notch, and further wherein said base includes a respective bolt aperture for each of said at least one bolt aperture of said metal holder, wherein said metal holder and said base are connected to said fluidic apparatus by bolts extending through said at least one bolt aperture of said metal holder and corresponding bolt aperture of said base, while said U-shaped notch of said metal holder for each tube connector engages with a groove around each tube connector.

* * * * *